US 11,482,709 B2

(12) United States Patent
Takemoto et al.

(10) Patent No.: US 11,482,709 B2
(45) Date of Patent: Oct. 25, 2022

(54) ALUMINUM OXIDE ARTICLE

(71) Applicant: Tosoh Finechem Corporation, Shunan (JP)

(72) Inventors: Yujin Takemoto, Shunan (JP); Masahiro Aoki, Shunan (JP); Kouji Toyota, Shunan (JP); Koichiro Inaba, Shunan (JP); Kentaro Sakai, Miyazaki (JP)

(73) Assignee: TOSOH FINECHEM CORPORATION, Shunan (JP)

( * ) Notice: Subject to any disclaimer, the term of this patent is extended or adjusted under 35 U.S.C. 154(b) by 302 days.

(21) Appl. No.: 16/495,961

(22) PCT Filed: Mar. 14, 2018

(86) PCT No.: PCT/JP2018/011242
§ 371 (c)(1),
(2) Date: Sep. 20, 2019

(87) PCT Pub. No.: WO2018/174114
PCT Pub. Date: Sep. 27, 2018

(65) Prior Publication Data
US 2020/0144623 A1 May 7, 2020

(30) Foreign Application Priority Data
Mar. 22, 2017 (JP) .............................. JP2017-056166

(51) Int. Cl.
*C04B 35/64* (2006.01)
*H01M 4/62* (2006.01)
(Continued)

(52) U.S. Cl.
CPC ............... *H01M 4/628* (2013.01); *C01F 7/02* (2013.01); *C01F 7/30* (2013.01); *C04B 35/10* (2013.01);
(Continued)

(58) Field of Classification Search
CPC ... C01F 7/02; C01F 7/30; C04B 35/10; C04B 35/64; C04B 2235/3217; C04B 2235/6567; C04B 2235/85; C01P 2002/01
See application file for complete search history.

(56) References Cited

U.S. PATENT DOCUMENTS 9,354,359 B2 * 5/2016 Makino .................. G02B 1/118

FOREIGN PATENT DOCUMENTS

JP       H08183139 A     7/1996
JP       2000071396 A    3/2000
(Continued)

OTHER PUBLICATIONS

Jeurgens et al. Structure and morphology of aluminium-oxide films formed by thermal oxidation of aluminium. Thin Solid Films vol. 418, Issue 2, Oct. 15, 2002, pp. 89-101.*

(Continued)

*Primary Examiner* — Noah S Wiese
(74) *Attorney, Agent, or Firm* — Panitch Schwarze Belisario & Nadel LLP

(57) ABSTRACT

An aluminum oxide article containing at least aluminum atoms and oxygen atoms is described. When observed under a transmission electron microscope, a cross section of the aluminum oxide article contains crystallized parts, in which a crystal lattice image is recognizable, and a non-crystallized part, in which no crystal lattice image is recognizable, and has an island-and-sea structure consisting of isolated parts containing the crystallized parts and the continuous non-crystallized part. The isolated parts correspond to island parts in the island-and-sea structure, the continuous non-crystallized part corresponds to a sea part, and a plurality of the island parts are uniformly distributed in the sea part. An aluminum oxide for improving the battery performance of a lithium ion secondary battery, the scratch resistance and (Continued)

hardness of a cured film, and the gas barrier properties of a gas barrier film is provided.

12 Claims, 6 Drawing Sheets

(51) Int. Cl.
*H01M 4/36* (2006.01)
*H01M 10/0525* (2010.01)
*C04B 35/10* (2006.01)
*C01F 7/02* (2022.01)
*C01F 7/30* (2022.01)

(52) U.S. Cl.
CPC ............ *C04B 35/64* (2013.01); *H01M 4/366* (2013.01); *H01M 10/0525* (2013.01); *C01P 2002/01* (2013.01); *C01P 2004/04* (2013.01); *C04B 2235/3217* (2013.01); *C04B 2235/6567* (2013.01); *C04B 2235/85* (2013.01)

(56) References Cited

FOREIGN PATENT DOCUMENTS

| | | | |
|---|---|---|---|
| JP | 2001139888 A | | 5/2001 |
| JP | 2001143703 A | | 5/2001 |
| JP | 2002151077 A | | 5/2002 |
| JP | 2002187738 A | | 7/2002 |
| JP | 2010140737 A | | 6/2010 |
| JP | 2013216760 A | | 10/2013 |
| JP | 2016043298 A | * | 4/2016 |
| JP | 2016043298 A | | 4/2016 |
| JP | 2016108313 A | | 6/2016 |
| JP | 2016143490 A | | 8/2016 |
| TW | 201612185 A | | 4/2016 |
| WO | 2012053433 A1 | | 4/2012 |
| WO | 2016027861 A1 | | 2/2016 |

OTHER PUBLICATIONS

Office Action dated Feb. 24, 2021 in TW Application No. 107109597.
Office Action dated Jul. 7, 2020 in JP Application No. 2017056166 (with English Machine Translation).
Bolt et al., "The interaction of thin NiO layers with single crystalline a-Al2O3(1120) substrates," Surface Science, vol. 329, pp. 227-240 (1995).
International Preliminary Report on Patentability dated Sep. 26, 2019 in International Application No. PCT/JP2018/011242.
International Search Report and Written Opinion dated May 22, 2018 in International Application No. PCT/JP2018/011242.
Sarapatka et al., "Pd-lnduced Charge Transports with Pd/Al2O3/Al Interface Formation," J. Phys. Chem., vol. 97, pp. 11274-11277 (1993).
Wefers et al., "Oxides and Hydroxides of Aluminum," Alcoa Laboratories, USA, Alcoa Technical Paper No. 19, 6 pages (1987).
Office Action dated Jun. 29, 2021 in CN Application No. 201880019986.3 (with English Machine Translation).
Communication pursuant to Rule 114(2) EPC including third party's observations dated Dec. 23, 2020 in EP Application No. 18771673.3.
Duenas et al., "Influence of single and double deposition temperatures on the interface quality of atomic layer deposited Al2O3 dielectric thin films on silicon," Journal of Applied Physics, vol. 99, No. 5, pp. 054902-1-054902-8 (2006).
Extended European Search Report dated Dec. 7, 2020 in EP Application No. 18771673.3.
Hu et al., "Optical properties of amorphous Al2O3 thin films prepared by a sol-gel process," Ceramics International, vol. 40, No. 9, pp. 14133-14139 (2014).
Lee et al., "Structure of Amorphous Aluminum Oxide," Physical Review Letters, vol. 103, No. 9, pp. 095501-1-095501-4 (2009).
Office Action dated Jan. 18, 2021 in IN Application No. 201917042107.
Office Action dated Jan. 17, 2022 in KR Application No. 1020197029810 (with English Machine Translation).
Office Action dated Jan. 24, 2022 in CN Application No. 201880019986.3 (with English Machine Translation).
Office Action dated Jul. 1, 2022 in CN Application No. 201880019986.3.

* cited by examiner

ALUMINUM OXIDE ARTICLE

CROSS-REFERENCE TO RELATED APPLICATION

This application is a Section 371 of International Application No. PCT/JP2018/011242, filed Mar. 14, 2018, which was published in the Japanese language on Sep. 27, 2018 under International Publication No. WO 2018/174114 A1, which claims priority under 35 U.S.C. § 119(b) to Japanese Application No. 2017-056166, filed Mar. 22, 2017, the disclosures of which are incorporated herein by reference in their entirety.

TECHNICAL FIELD

The present invention relates to an aluminum oxide article having appropriate crystallinity and non-crystallinity (amorphousness). More particularly, the present invention relates to an aluminum oxide article that is useful as an electrode coating film for non-aqueous secondary batteries, as a cured film with enhanced scratch resistance or hardness, and as a gas barrier film that combines high gas barrier properties and high transparency.

BACKGROUND ART

Alumina (aluminum oxide) exhibits excellent insulation, heat resistance, abrasion resistance and chemical resistance, and is widely used as a sliding component in insulation parts in electrical equipment, refractories in crucibles and parts for exhaust gas, as well as in dental implants and medical osteosynthesis parts.

Alumina presents numerous known structures, of 11 types, namely amorphous, $\alpha$, $\beta$, $\gamma$, $\delta$, $\zeta$, $\eta$, $\theta$, $\kappa$, $\rho$ and $\chi$, (NPL 1).

In recent years alumina has come to be used also in surface coating films of positive electrode active materials, for the purpose of improving thermal stability and cycle characteristics, during charging, of lithium ion secondary batteries of superior power density and energy density (PTL 1 and 2).

Alumina is also used in cured coating films that combine transparency with wear resistance and scratch resistance, on the surface of for instance plastic optical components, touch panels and film-type liquid crystal elements (PTL 3).

Alumina is further used as gas barrier films that combines transparency with an oxygen and/or moisture blocking effect, as a packing material for instance in food or pharmaceuticals (PTL 4).

Although alumina is thus highly useful, it has been necessary to use a binder and/or physical pressure in order to coat an electrode active material or a resin with alumina crystals. Forming a coating film in accordance with such a method, moreover, has been problematic on account of the difficulty of forming a thin film due to the size of alumina or the added thickness of the binder. This results in for instance problems of lower transparency and poorer battery performance.

[PTL 1] Japanese Patent Application Publication No. 2001-143703
[PTL 2] Japanese Patent Application Publication No. 2010-140737
[PTL 3] Japanese Patent Application Publication No. 2001-139888
[PTL 4] Japanese Patent Application Publication No. H08-183139
[PTL 5] Japanese Patent Application Publication No. 2002-151077
[PTL 6] Japanese Patent Application Publication No. 2016-143490
[PTL 7] Japanese Patent Application Publication No. 2002-187738
[PTL 8] Japanese Patent Application Publication No. 2000-71396
[PTL 9] Japanese Patent Application Publication No. 2013-216760
[NPL 1] Oxides and Hydroxides of Aluminum, Alcoa Laboratories, USA, 1987
[NPL 2] Bolt P. H. et al., Surf. Sci. 329 227 (1995)
[NPL 3] Sarapatka T. J., J. Phys. Chem. 97 11274 (1993)

The entire descriptions of PTL 1 to 9 and NPL 1 to 3 are specifically incorporated herein by reference.

SUMMARY OF INVENTION

Technical Problem

A method (so-called sol-gel method) in which coating is accomplished through hydrolysis of an aluminum compound having hydrolyzable organic groups is known as a method for applying thinner alumina coatings. For instance, PTL 5 and 6 propose a method for forming a thin film on the surface of a positive electrode of a lithium ion secondary battery in accordance with a sol-gel method. PTL 7 proposes a method for forming a cured film on a glass substrate in accordance with a sol-gel method. Further, PTL 8 and 9 propose methods for coating a thermoplastic resin film with a gas barrier film, in accordance with a sol-gel method.

In the methods disclosed in PTL 5 and 6, an aluminum hydroxide colloid generated by hydrolysis is caused to adsorb on positive electrode active material particles, and a thermal treatment is performed thereupon in an oxidizing atmosphere. It is however known that an amorphous structure arises when aluminum hydroxide is treated at a temperature of 700° C. or lower, while when aluminum hydroxide is brought to a high temperature of about 900° C., crystallization progresses from the surface of the particles, and accordingly the crystalline state is non-uniform on the surface and in the interior. Further, PTL 5 (paragraph [0020]) and PTL 6 (paragraph [0087]) indicate that the coatings formed in accordance with the respective methods are part of particles or are dispersed coating films, such that, portions at which the oxide coating film is not formed are preferably dispersed across the surface of the particles. In recent years however operating voltages have risen steadily, with a view to achieving higher energy densities. This has become problematic in that the presence of contact portions between an electrolyte solution and a high-voltage electrode surface during charging exacerbates decomposition of the electrolyte solution, which results in lowered battery performance.

PTL 7 indicates that the coating film formed in accordance with the method disclosed therein has an amorphous structure. This pencil hardness was low, and not wholly satisfactory, unless a special method is resorted to, such as ultraviolet irradiation.

In the method of PTL 8, moreover, a coating film that combines good transparency and good gas barrier properties could not be formed unless a special method, such as autoclaving or ultraviolet irradiation, is resorted to.

In view of the above considerations, it is an object of the present invention to provide an aluminum oxide article that is useful as an electrode coating film that improves the battery performance of lithium ion secondary batteries, as a cured film of enhanced scratch resistance or hardness, and as a gas barrier film that combines high gas barrier properties and high transparency.

Solution to Problem

As a result of diligent research aimed at solving the above problem, the inventors found that the battery performance of a lithium ion secondary battery, hardness and scratch resistance in a cured film, and also gas barrier properties in a gas barrier film, are improved through the use of an aluminum oxide article in which crystallized portions and a non-crystalline portion are present evenly, and accomplished the present invention on the basis of that finding.

Specifically, the present invention is as follows.

[1] An aluminum oxide article composed at least of aluminum atoms and oxygen atoms,
  wherein a cross section of the aluminum oxide article as observed by transmission electron microscopy includes a crystallized portion in which a crystal lattice image is identified, and a non-crystalline portion in which no crystal lattice image is identified;
  the article has a sea-island structure including isolated portions that include the crystallized portion, and a continuous non-crystalline portion (wherein the isolated portions correspond to island parts of the sea-island structure, and the continuous non-crystalline portion corresponds to a sea part of the sea-island structure); and
  a plurality of the island parts is uniformly interspersed in the sea part.

[2] The aluminum oxide article according to [1], wherein the island parts have a structure in which no crystal lattice image is identified in a central portion, while a peripheral portion is the crystallized portion.

[3] The aluminum oxide article according to [1] or [2], wherein the sea-island structure in which a plurality of the island parts is uniformly interspersed in a sea is observed in a region of at least 100 nm×100 nm within an image of the cross section.

[4] The aluminum oxide article according to any one of [1] to [3], wherein the article is a thin film, independent film, or independent mass provided on a base material.

[5] The aluminum oxide article according to any one of [1] to [4], wherein when a transmission electron microscopy image of a cross section of the aluminum oxide article is evenly divided into three in the depth direction from the article surface, the relationships 0.9<A/X, B/X, and C/X<1.1 are satisfied, when the average value of particle size of the island parts present in an outermost surface region is denoted by A, the average value of particle size of the island parts present in a middle region is denoted by B, the average value of particle size of the island parts present in a deepest region is denoted by C, and the average value of particle size of the island parts present over the entire cross section of the article is denoted by X.

[6] The aluminum oxide article according to any one of [1] to [5], wherein when a transmission electron microscopy image of a cross section of the aluminum oxide article is evenly divided into three in the depth direction from the article surface, the relationships 0.27<a/Y, b/Y, and c/Y<0.40 are satisfied when the number of island parts in an outermost surface region is denoted by a, the number of island parts in a middle region is denoted by b, the number of island parts in a deepest layer is denoted by c, and the number of islands in total is denoted by Y.

[7] The aluminum oxide article according to any one of [1] to [6], wherein the article has a pencil hardness of F, or harder than F.

[8] A method for producing an aluminum oxide article, comprising: a step of preparing a dried product containing an alkylaluminum partial hydrolysate from a solution containing an alkylaluminum partial hydrolysate; and
  a step of heating the dried product at a temperature of 70° C. or higher to obtain an aluminum oxide article composed at least of aluminum atoms and oxygen atoms,
  wherein the heating is carried out until an aluminum oxide article having a structure that satisfies (1) to (3) below is obtained,
  (1) a cross section of the aluminum oxide article as observed by transmission electron microscopy includes a crystallized portion in which a crystal lattice image is identified, and a non-crystalline portion in which no crystal lattice image is identified;
  (2) the article has a sea-island structure including isolated portions that include the crystallized portion, and a continuous non-crystalline portion (wherein the isolated portions correspond to island parts of the sea-island structure, and the continuous non-crystalline portion corresponds to a sea part of the sea-island structure); and
  (3) a plurality of the island parts is uniformly interspersed in the sea part.

[9] The production method according to [8], wherein conditions in the heating are a baking time of 10 minutes or longer at a temperature of 100° C., and a baking time of 2 minutes or longer at a 400° C.

[10] The production method according to [8] or [9], wherein the alkylaluminum is a compound represented by Formula (1) below.

$$AlR^1_{3-n}X_n \quad (1)$$

(In the formula, $R^1$ each independently represent a $C_1$-$C_8$ linear or branched alkyl group, alkoxy group or acyloxy group; X represents hydrogen or a halogen atom; and n is an integer from 0 to 2.)

[11] The production method according to any one of [8] to [10], wherein the alkylaluminum partial hydrolysate is obtained using water in a molar ratio of 1.3 or less with respect to the alkylaluminum of Formula (1).

[12] The production method according to any one of [8] to [11], wherein the dried product is prepared on a base material.

[13] The production method according to any one of [8] to [12], wherein the thickness of the aluminum oxide article from the surface to a deepest part falls within the range of 5 nm to 5 μm.

Advantageous Effects of Invention

The present invention allows providing an aluminum oxide article useful as an electrode coating film that enhances the battery performance of lithium ion secondary batteries, as a cured film of enhanced scratch resistance or hardness, and as a gas barrier film that combines high gas barrier properties and high transparency.

DESCRIPTION OF EMBODIMENTS

Figure 1:
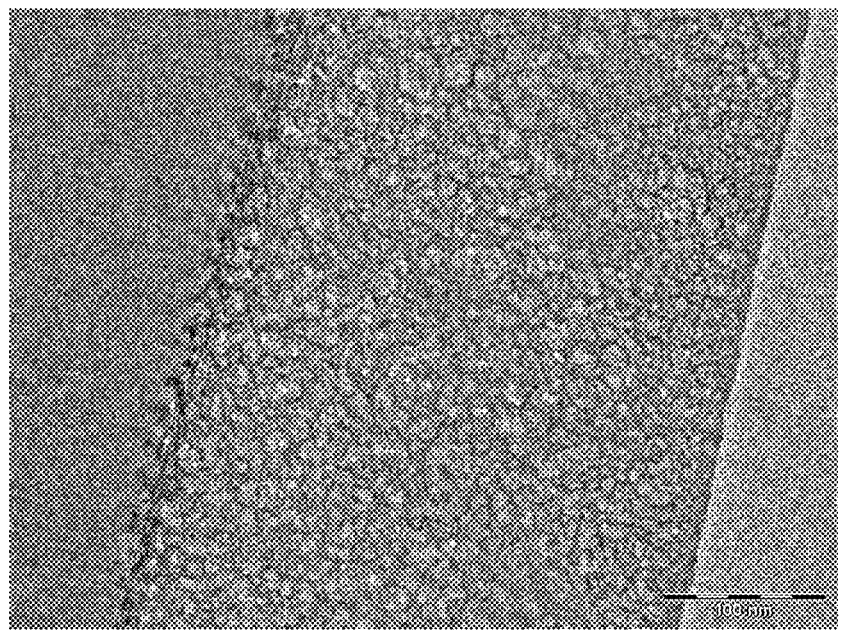
FIG. 1 is a TEM image (50,000×) of Example 1.

The invention is described in more detail below.

The aluminum oxide article of the present invention is composed at least of aluminum atoms and oxygen atoms, and includes, in a cross-sectional observation by transmission electron microscopy, crystallized portions in which a crystal lattice image is identified, and a non-crystalline portion in which no crystal lattice image is identified. Further, the aluminum oxide article has a sea-island structure including isolated portions that contain the crystallized portions, and a continuous non-crystalline portion, with the plurality of island parts uniformly interspersed in the sea part. The above isolated portions correspond to the island parts of the sea-island structure, and the continuous non-crystalline portion corresponds to the sea part of the sea-island structure.

Thus, high-hardness crystallized portions and a non-crystalline portion having high gas barrier properties and high ion conductivity can be co-present by virtue of the fact that the island parts, including the crystallized portions, are uniformly interspersed in the sea part of the non-crystalline portion. As a result, it becomes possible to increase battery performance in uses as an electrode coating film of a lithium ion secondary battery, and to increase scratch resistance and hardness in uses as a cured film, while the gas barrier properties as a gas barrier film are likewise improved.

The term "crystallized portions" denotes herein portions in which a crystal lattice image is identified, and the term "non-crystalline portion" denotes a portion in which no crystal lattice image is identified, upon observation using a transmission electron microscope (hereafter TEM for short). The transmission electron microscope that is used is not particularly limited, and for instance JEM-2010 by JEOL Ltd. can be utilized herein. The measurement method for checking lattice images is not particularly limited, and for instance may involve bright-field high-magnification, at an acceleration voltage of 200 kV.

On the basis of cross-sectional low-magnification (for instance 2,000× to 200,000×) TEM images it was found that the aluminum oxide article of the present invention has formed therein a sea-island structure with phase-separated island parts and a sea part, in the depth direction from the surface towards the interior of the aluminum oxide article (see for instance FIGS. 2, 3, 4 and 5). In the light of cross-sectional high-magnification TEM images (for instance 800,000× to 1,500,000×), there were further discerned lattice images (see for instance FIGS. 3 and 4) in the vicinity of the outer periphery of the island parts. From the above it was found that the cross sections of the island parts have a structure in which no crystal lattice image is identified in a central portion, while a peripheral portion is the crystallized portions. Three-dimensionally, the island parts have a structure in which the outer periphery is covered by a crystallized portion while the interior is a non-crystalline structure having not undergone crystallization, or alternatively, the outer periphery is crystallized. Accordingly, it is surmised that the island parts are grains having a structure comparatively close to a crystallized structure. It is deemed that in the island parts crystallization may progress from the outer periphery towards the interior, as a result of imparting of energy, such as heat, to the island parts. On the other hand, the sea part is deemed to have a non-crystalline structure, since no lattice images are observed in the sea part.

As specifically illustrated in the examples, cross-sectional observations reveal that the size of the island parts is comparatively uniform, and the island parts are evenly dispersed in the sea part (see for instance FIGS. 2, 3, 4 and 5). Accordingly, it is deemed that crystallized portions and non-crystalline portions are uniformly mixed within the aluminum oxide article.

In the aluminum oxide article of the present invention, the sea-island structure in which a plurality of the island parts is uniformly interspersed in the sea part, is preferably observed in a region of at least 100 nm×100 nm within an image of the cross section. More preferably, the sea-island structure is observed throughout or substantially throughout the aluminum oxide article.

When a transmission electron microscopy image of a cross section (cross-sectional TEM image) of the aluminum oxide article of the present invention is divided evenly into three in the depth direction from the article surface, the relationships $0.9 < A/X$, $B/X$, and $C/X < 1.1$ are preferably satisfied, when the average value of particle size of the island parts present in an outermost surface region is denoted by A, the average value of particle size of the island parts present in a middle region is denoted by B, the average value of particle size of the island parts present in a deepest region is denoted by C, and the average value of particle size of the island parts present over the entire cross section of the article is denoted by X, from the viewpoint of making the sizes of the island portions comparatively uniform. Specifically, there hold $0.9 < A/X < 1.1$, $0.9 < B/X < 1.1$ and $0.9 < C/X < 1.1$. Herein A/X, B/X and C/X are each independently higher than 0.9 and lower than 1.1.

In a case where the ratios of average value of particle size of the island parts are each independently 0:9 or lower, or 1.1 or higher, island parts of different particle size tend to become ubiquitous, and the hardness in those portions may decrease. Accordingly, the ratios of average value of particle size of the island parts preferably lie within the above ranges.

In the aluminum oxide article of the present invention, when a transmission electron microscopy image of a cross section of the aluminum oxide article of the present invention is divided evenly into three, in the depth direction from the article surface, the relationships $0.27 < a/Y$, $b/Y$, and $c/Y < 0.40$ are preferably satisfied when the number of island parts in an outermost surface region is denoted by a, the number of island parts in a middle region is denoted by b, the number of island parts in a deepest layer is denoted by c, and Y denotes the number of islands in total is denoted by Y, from the viewpoint of achieving uniform dispersion of the island parts in the sea part. Specifically, there hold $0.27 < a/Y < 0.40$, $0.27 < b/Y < 0.40$ and $0.27 < c/Y < 0.40$. Herein a/Y, b/Y and c/Y are each independently higher than 0.27 and lower than 0.40. Elements other than aluminum and oxygen can be intermixed in the aluminum oxide article, so long as the physical properties of the article of the present invention are not impaired thereby.

In a case where the ratios of average value of the number of island parts are independently 0.27 or lower, or 0.40 or higher, hardness at portions with few island parts may decrease; accordingly, the ratios of average value of the number of island parts lie preferably within the above ranges.

The crystal structure included in the crystallized portions of the aluminum oxide article of the present invention may be a crystal structure that contains aluminum and oxygen atoms. For instance, $\alpha$, $\beta$, $\gamma$, $\delta$, $\zeta$, $\eta$, $\theta$, $\kappa$, $\rho$ and $\chi$ structures are known as crystal forms of alumina (aluminum oxide), but the crystal structure is not particularly limited so long as it is not a non-crystalline (amorphous) structure. As pointed out in the examples below, no diffraction peaks were obtained in XRD resorted to in the examples. Accordingly, the crystal structure of the crystallized portion could not be identified by XRD resorted to in the examples.

The aluminum oxide article of the present invention can be used as a thin film that is provided on a base material. Alternatively, the aluminum oxide article may be used without a base material, in the form of an independent film, or independent mass. In a case where the aluminum oxide article is a thin film provided on a base material, the thickness of the film from the surface of the aluminum oxide up to the deepest part is not particularly limited, and may for instance fall within the range of 5 nm to 5 µm, or 10 nm to 1 µm, or 50 nm to 1 µm, and further in the range of 100 nm to 1 µm.

The pencil hardness of the aluminum oxide article of the present invention is F, or harder than F. The hardness of the aluminum oxide article of the present invention is high by virtue of the fact that the aluminum oxide article has the above sea-island structure. The pencil hardness of the aluminum oxide article of the present invention is preferably H or higher.

(Method for Identifying Aluminum Oxide Article)

In the present invention, aluminum oxide in which the crystallized portions and non-crystalline portions are uniformly intermixed is identified by TEM. A method for acquiring TEM images, a method for analyzing crystallized portions on the basis of TEM images, and a method for analyzing the uniformity of the crystallized portions and non-crystalline portion will be explained next.

<TEM Image Acquisition Method>

Methods that involve sectioning of aluminum oxide in the cross-sectional direction are known as methods for acquiring TEM images of cross sections of aluminum oxide articles. The sectioning method is not particularly limited, and may be for instance a method in which a general sectioning device is utilized, for instance an argon ion slicer, a focused ion beam (FIB) apparatus, an ultramicrotome or the like.

<TEM Image Analysis Method>

The distribution state of the "crystallized portions" and the "non-crystalline portion" of the aluminum oxide article of the present invention can be checked by slicing the aluminum oxide in the cross-sectional direction, and comparing then the island parts and the sea part in the observed sea-island structure, on the basis of a TEM image observed at low magnification (2,000× to 200,000×). Concerning the magnifications during observation of TEM image, it is preferable to ascertain a structure in the depth direction, from the surface towards the interior of the aluminum oxide article, on the basis of the same TEM image; accordingly, it is preferable to select magnifications such that the entire aluminum oxide is identified, or to select magnifications such that the sea-island structure is identified. In a case where the thickness from the surface to the deepest part of the aluminum oxide is large, and the magnifications allow the aluminum oxide as a whole to be discerned, but not the sea-island structure, then images may be acquired divisionally, and be analyzed, in the depth direction of the aluminum oxide article from the surface towards the interior. When acquiring images divisionally it is preferable to measure the respective images at a same magnification.

Figure 4:
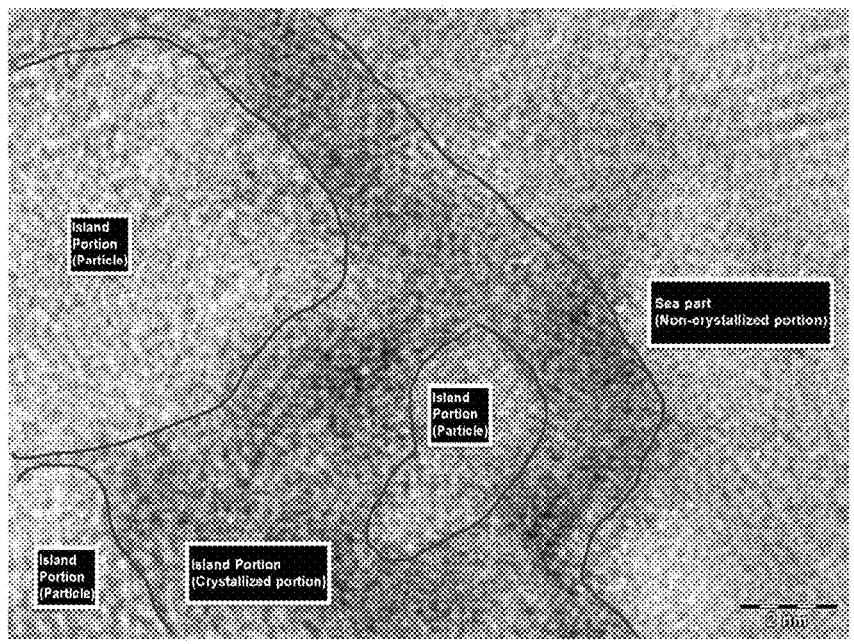
FIG. 4 is an identification result of grains and peripheral crystallized portions, being island parts, and a non-crystalline portion, being a sea part, in the TEM image (1,500,000×) of Example 1.
Figure 5:
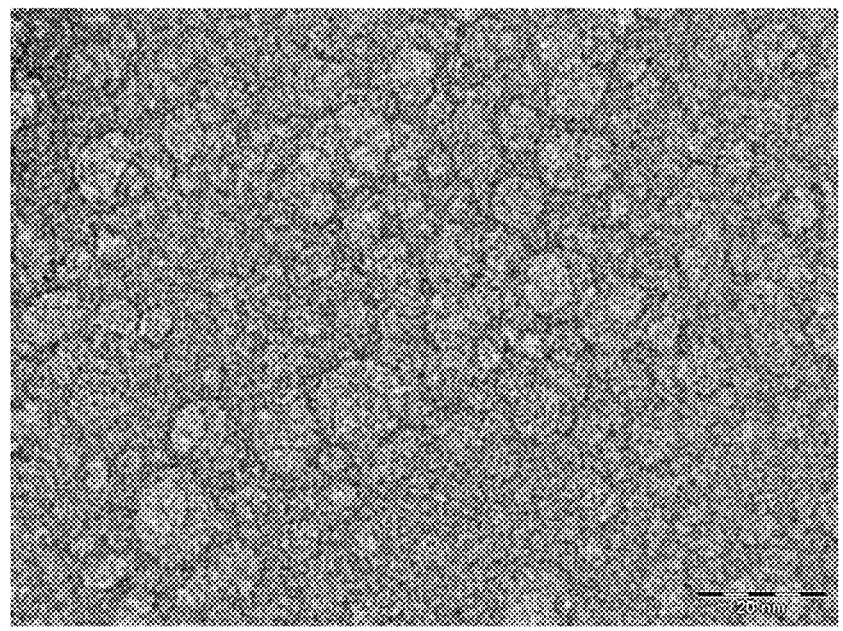
FIG. 5 is a TEM image (200,000×) of Example 1.

The term "sea-island structure" in TEM images observed at low magnification is a structure in which the "sea part" and the "island parts" are intermixed in the TEM image. This is depicted in FIG. 1 described below. The term "sea part" denotes a region of relative abundance of a non-crystalline portion, due to the absence of observable lattice images in a TEM image observed at high magnifications (800,000× to 1,500,000×). The island parts are deemed to be grains having a structure where the outer periphery is a crystallized portion, since lattice images is identified in the vicinity of the outer periphery, and the interior is non-crystalline, or non-crystalline but readily crystallizable since the outer periphery is crystallized. The island parts have, three-dimensionally, a structure in which the periphery of non-crystalline grains is covered by a crystallized portion. A check on the basis of low-magnification TEM images reveals distinct shade contrast at the periphery of grains. Thus, it becomes possible to identify, as island parts, those sites where grains is identified on the basis of differences in shade contrast. FIG. 4 illustrates crystallized portions of island parts, as well as non-crystal portions of island parts, and a sea part (non-crystalline portions).

An examination of the size and dispersion state of the island parts in the light of the above clearly reveals a non-crystalline portion, and the uniform interspersing of the plurality of island parts in the sea part.

A method that involves evaluating particle size in the form of the size of island portions on the basis of image analysis software, can be used herein order to grasp the size and dispersion state of the island parts. Ordinarily used image analysis software can be utilized as the image analysis software. For instance, MacView or the like can be used herein.

Figure 2:
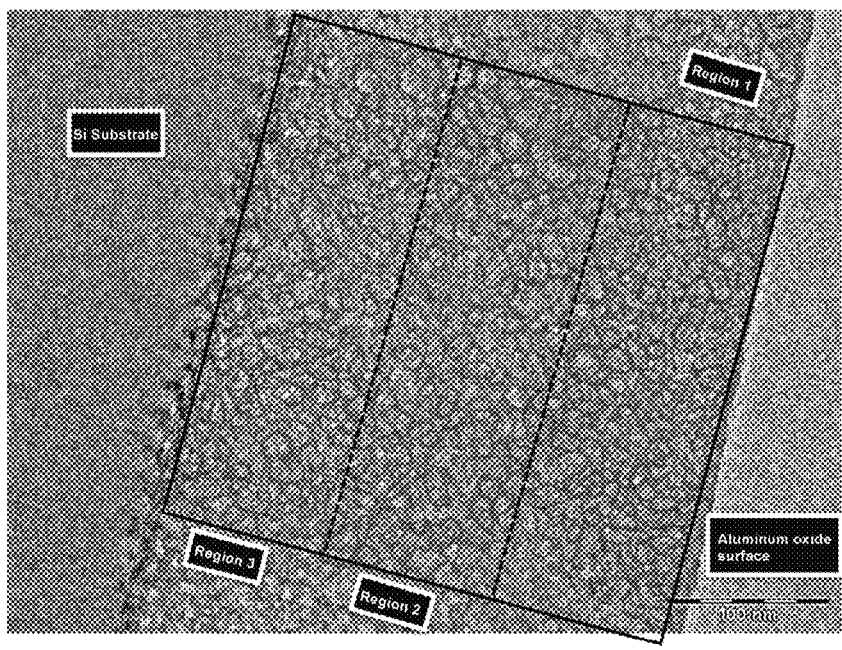
FIG. 2 is an identification result of island parts in the TEM image (50,000×) of Example 1.
Figure 3:
FIG. 3 is a TEM image (1,500,000×) of Example 1.

Specifically, the aluminum oxide article is sliced in the cross-sectional direction, and a TEM image observed at low magnification is loaded, in the form of a general image digital file, into the analysis software (MacView), serving herein as the image analysis software, whereupon island portions observed as bright areas are identified as grains. As the region for identification there is preferably used the interior of a rectangle (for instance of rectangular or square shape) that encompasses the entirety of the aluminum oxide article, in an orientation in the depth direction from the surface towards the interior of the aluminum oxide article. Further, the region of the rectangle is divided into three in the depth direction from the surface towards the interior of the aluminum oxide article, and there are identified the island parts in each of the three resulting regions, namely region 1 being a region of an outermost surface layer, region 2 being a region of an intermediate layer, and region 3 being a region of a deepest layer. The identification method may be a manual identification method or an automatic identification method. In manual identification a method can be resorted to in which bright locations having a dark contour in the periphery thereof, in the TEM image, are identified as island parts. FIG. 2 illustrates an example of a TEM image of Example 1 obtained in accordance with such a method. In the case of automatic identification, the identification conditions are adjusted for each image so as to enable identification of island parts. After identification of the island portions, information about the particle size, particle size distribution and particle distribution of the island portions are obtained. Further, the region of a rectangle is divided, in a depth direction from the surface of the aluminum oxide article towards the interior, into three regions, namely region 1 being a region of the outermost surface layer, region 2 being an intermediate layer, and region 3 being the region of a deepest layer, and the island parts in each region are identified. Island parts present in the vicinity of boundaries of respective regions are preferably identified as island parts of that region in which the island parts are present in a higher area proportion. Thereafter, the average value of particle size and the number of particles in each region are worked out, and are compared; as a result, it becomes possible to ascertain the dispersion state of the island parts in the aluminum oxide article. Specifically, there can be examined the dispersion state of the crystallized portions and the non-crystalline portions.

(Method for Producing Aluminum Oxide Article)

A method for producing an aluminum oxide article of the present invention includes:

a step of applying a solution containing an alkylaluminum partial hydrolysate, with drying; and a step of heating the dried product at a temperature of 70° C. or higher to obtain an aluminum oxide article composed at least of aluminum atoms and oxygen atoms, wherein the heating is carried out until an aluminum oxide article having a structure that satisfies (1) to (3) below is obtained, (1) a cross section of the aluminum oxide article as observed by transmission electron microscopy includes a crystallized portion in which a crystal lattice image is identified, and a non-crystalline portion in which no crystal lattice image is identified;

(2) the article has a sea-island structure including isolated portions that include the crystallized portion, and a continuous non-crystalline portion (wherein the isolated portions correspond to island parts of the sea-island structure, and the continuous non-crystalline portion corresponds to a sea part of the sea-island structure); and (3) a plurality of the island parts is uniformly interspersed in the sea part.

The solution containing an alkylaluminum partial hydrolysate may be for instance obtained through partial hydrolysis of a solution resulting from diluting an alkylaluminum in a solvent. Partial hydrolysis of an alkylaluminum produces a precursor in which binding sites of aluminum and oxygen are formed beforehand; these binding portions give rise to nuclei upon heating, thanks to which island parts become formed uniformly without being ubiquitous.

The alkylaluminum is a compound represented by Formula (1) below.

$$AlR^1{}_{3-n}X_n \quad (1)$$

(In the formula, $R^1$ each independently represent a $C_1$-$C_8$ linear or branched alkyl group, alkoxy group or acyloxy group; X represents hydrogen or a halogen atom such as fluorine, chlorine, bromine or iodine; and n is an integer from 0 to 2.)

The solution resulting from hydrolysis of an alkylaluminum is a solution containing an alkylaluminum partial hydrolysate obtained through partial hydrolysis of the alkylaluminum represented by Formula (1) in an organic solvent.

As the organic solvent, a solvent may be used that exhibits solubility towards the alkylaluminum represented by Formula (1), or a partial hydrolysate of the alkylaluminum. Examples of the organic solvent include electron-donating organic solvents and hydrocarbon compounds. Examples of electron-donating organic solvents include for instance cyclic amides such as N-methyl-2-pyrrolidone, 1,3-dimethyl-imidazolidinone and 1,3-dimethyl-3,4,5,6-tetrahydro-2(1H)-pyrimidinone; ethers such as diethyl ether, tetrahydrofuran, diisopropyl ether, dioxane, di-n-butyl ether, dialkyl ethylene glycols, dialkyl diethylene glycols and dialkyl triethylene glycols; as well as glymes, diglymes and triglyme solvents.

Examples of hydrocarbon compounds include aliphatic hydrocarbons such as n-hexane, octane and n-decane; alicyclic hydrocarbons such as cyclopentane, cyclohexane, methylcyclohexane and ethylcyclohexane; aromatic hydrocarbons such as benzene, toluene, xylene and cumene; and hydrocarbon solvents such as mineral spirits, solvent naphtha, kerosene and petroleum ether.

An organic solvent having solubility in water can be used, singly, as the organic solvent; alternatively, an organic solvent soluble in water and an organic solvent that is sparsely soluble in water can be used concomitantly. The organic solvent can be an electron-donating solvent, a hydrocarbon compound, or a mixture of the foregoing.

Hydrolysis is preferably carried out with a molar ratio of 1.3 or less with respect to the alkylaluminum of Formula (1). In a case where water is added in excess of a molar ratio of 1.3, crystals may precipitate in the solution that yields a precursor, and the island parts in the aluminum oxide article may become nonuniform.

The step of preparing a dried product containing an alkylaluminum partial hydrolysate from a solution containing an alkylaluminum partial hydrolysate is not particularly limited, but for instance, a coating film can be formed in accordance with a method that involves coating a base material surface with a solution containing an alkylaluminum partial hydrolysate; a method that involves immersing a base material in a solution containing an aluminum starting material; or a method that involves precipitating an alkylaluminum partial hydrolysate from a solution containing an aluminum starting material, and drying then the resulting formed coating film. The method for coating the base material surface is not particularly limited, and may be for instance dip coating, spin coating, slit coating, slot coating, bar coating, roll coating, curtain coating, an ink jet method, screen printing or an immersion method.

The dried product is then heated at a temperature of 70° C. or higher to obtain an aluminum oxide article composed at least of aluminum atoms and oxygen atoms. The heating device is not particularly limited. For instance, a device such as a hot plate that applies heat from the bottom of a base material can be used for heating a dried product provided on the base material. In other cases, a heating device such as an electric furnace can be used that applies heat from the aluminum oxide surface.

The heating is carried out until an aluminum oxide article is obtained having a structure that satisfies (1) to (3) above.

The thermal treatment temperature is set to 70° C. or higher, preferably to fall within the range of 75° C. to 800° C., and yet more preferably to fall within the range of 75° C. to 700° C., from the viewpoint of obtaining an aluminum oxide article having a structure that satisfies (1) to (3) above. In a case where the temperature is lower than 70° C., a crystal structure cannot be formed successfully, while a temperature in excess of 800° C. may give rise to an overall crystalline state, not a uniform composition of a non-crystalline state. In the method for producing the aluminum oxide article of the present invention the duration of the thermal treatment depends on the heating temperature, and is adjusted to a range such that an aluminum oxide article having a structure that satisfies (1) to (3) above is obtained. For instance, an aluminum oxide article having a structure that satisfies (1) to (3) above is preferably obtained through setting of the baking time to 10 minutes or longer for a baking temperature of 75° C., setting the baking time to 10 minutes or longer for a baking temperature of 100° C., and setting the baking time to 2 minutes or longer for 400° C.

In the present invention, the base material for forming the aluminum oxide is not particularly limited as regards material, shape, dimensions and so forth, and there can be used for instance inorganic materials such as glass, metals and ceramics; organic materials such as resinous base materials, for instance plastics, as well as paper and wood; and also composites of the foregoing.

In a case where for instance the base material is coated with the aluminum oxide, the thickness from the surface up to the deepest part of the aluminum oxide is not particularly limited and can be selected depending on the use of the coating, being preferably 5 nm to 10 μm, more preferably 10 nm to 5 μm.

The aluminum oxide of the present invention can be used as a coating film of an active material of a Li ion secondary battery, as a gas barrier film for packing of food or pharmaceuticals, or in flat panel displays, photovoltaic elements, and organic EL elements, or as a hard coating film in plastic optical components and touch panels.

(Others)

The uniformity of the structure derived from aluminum, in the depth direction from the surface towards the interior of the aluminum oxide article, can be ascertained by X-ray photoelectron spectroscopy (XPS). This is specifically one spectroscopic measurement method of the uniformity, in the depth direction from the surface towards the interior of the aluminum oxide article, of the sea-island structure "crystallized portion and non-crystalline portion". Upon irradiation of a sample surface with X-rays in ultra-high vacuum, photoelectrons are emitted from the surface on account of the photoelectric effect. Information relating to the chemical state of the surface can be obtained by observing the kinetic energy of the photoelectrons. In the present measurement the detection range of photoelectrons from the sample surface is 0.8 mm(1), as a result, there can be obtained averaged information about specific locations, in the depth direction from the surface towards the interior of the aluminum oxide article.

An explanation follows next on an XPS measurement method and a structure analysis method based on XPS peaks, of the present invention.

The aluminum and oxygen composition in the aluminum oxide article of the present invention can be measured by X-ray photoelectron spectroscopy (XPS).

By repeatedly etching the aluminum oxide article with argon ion energy and performing an XPS measurement it becomes possible to acquire peak information in the form of binding energy of aluminum and oxygen in the depth direction, from the surface towards the interior of the aluminum oxide article.

The method for specifying a measurement location in the depth direction from the surface towards the interior of the aluminum oxide article may rely on working out an etching rate. The etching rate (nm/minute) can be calculated in accordance with the expression below.

Etching rate (nm/minute)=thickness (nm) of the aluminum oxide from the base material/total (minutes) of etching time of the aluminum oxide region The thickness of the aluminum oxide article from the base material can be measured for instance by SEM, TEM or the like. As the total etching time of the aluminum oxide article there can be used herein the total time required for etching up to a region, of the aluminum oxide article, defined as a region up to a point at which XPS peaks of the base material appear.

The measurement location in the depth direction from surface towards the interior of the aluminum oxide article can be specified on the basis of the time required for etching, and the etching rate.

By comparing the ratios of peak area intensity of the peak of 2p orbitals of aluminum and the peak of the 1s orbital of oxygen it becomes possible to check changes in the composition of Al and O at respective sites in the depth direction from the surface of the aluminum oxide article. The ratio of the peak area intensities of Al and O can be calculated in accordance with the expression below.

Ratio of peak area intensity of Al and O=surface area of peak of 2p orbitals of Al/surface area of peak of 1s orbital of O The bonding state of aluminum can be ascertained through comparison of the peak of the 2p orbitals of Al in the depth direction, from the surface towards the interior of the aluminum oxide article. The bonding state reflects structural information.

The 2p orbital peak of Al in the aluminum oxide article of the present invention can be subjected to fitting, to be thereby separated into two peaks, namely a separated peak 1 and a separated peak 2. Although not evident, the two peaks are deemed to denote a structure such as the one described below.

The energy position of the separated peak 1 is about 71.9 eV, and the energy position of the separated peak 2 is about 73.0 eV. In ordinary XPS spectra it is necessary to correct energy shifts derived from sample charging. The present measurement, however, is carried out while the sample is being cut by argon etching, and no peak energy of a reference element is obtained. Accordingly, no energy shift correction is carried out. The Al 2p peak energy position derived from Al-O bonds in perfect crystals of alumina is reported as 74.5 eV (NPL 2), while the Al 2p peak energy position derived from Al—Al bonds of metallic aluminum is reported as 72.7 eV (NPL 3). The peaks observed in the present measurement lie close to the reported peak energy positions derived from Al—O and Al—Al bonds, which hints at the presence of Al having bonds with some element. The separated peak 1 on the low-energy side is a main peak in the XPS spectrum of Al, and is deemed to be a peak that reflects crystallized portions and non-crystalline portions. Further, element peaks other than Al, O and C are not observed in the present measurement, and accordingly it is deemed that x in the AlOx of the aluminum oxide article of the present invention obeys $0<x<1.5$. Further, x in the AlOx of the aluminum oxide article of the present invention can obey $0.5<x<1.5$. The separated peak 2 on the high energy side is deemed to be a peak derived from bonds between Al atoms and hydroxyl groups (OH groups). These hydroxyl groups are deemed to derive from the starting materials.

Peaks can be separated by using for instance the analysis software OriginPro. Specifically, firstly a baseline processing is carried out, followed by peak fitting. Examples of baseline processing include methods in which constants are selected, and methods that utilize an XPS baseline model (Sherley, Tougaard). Preferred herein is a method that relies on an XPS model. A general fitting function such as a Gauss function or Lorentz function can be used as the fitting function for peak fitting.

By comparing the ratios of surface area of the separated peak 1 and of the separated peak 2 at respective measurement locations, in the depth direction from the surface towards the interior of the aluminum oxide article, it becomes possible to ascertain the bonding state of Al atoms in the depth direction from the surface towards the interior of the aluminum oxide.

EXAMPLES

The present invention will be described in more detail below on the basis of examples, synthesis examples, reference examples and comparative examples, but the invention is not limited to the examples below.

Synthesis Example 1

Herein 11.35 g of triethyl aluminum (hereafter TEAL for short) were added at room temperature to 73.2 g of N-methyl-2-pyrrolidone (hereafter NMP for short). Then 1.08 g of water were dropped, within a temperature range of 20±5° C., onto the TEAL/NMP solution obtained through sufficient stirring. The molar ratio of water with respect to TEAL at this time (water/TEAL) was 1.0. After dropping of a predetermined amount of water, the whole was heated up to 65° C., and the reaction was allowed to proceed for 2.5 hours at 65° C. Once the reaction was over, the whole was allowed to cool, and the reaction product was recovered. The product after the reaction was a yellow transparent solution. A very small amount of a gel-like insoluble matter included in the product was filtered off using a filter (pore: 3 μm or smaller), and an NMP solution of a TEAL partial hydrolysate was recovered (solution A).

Synthesis Example 2

Herein 0.2 g of aluminum isoproxide ((iPrO)$_3$Al) were added, at room temperature, to 16 g of heptane, 0.35 g of diisopropylene glycol and 0.65 g of isopropanol, followed by thorough stirring. A centrifugal settling machine was used in order to remove a very small amount of white unwanted matter included in the product, and only a colorless transparent portion of supernatant was recovered (solution B).

Then 0.20 g of 28% ammonia water and 26.02 g of ultrapure water were mixed, to prepare a hydrolysis solution for gel precipitation (Solution C).

The structure of the aluminum oxide articles in the examples and reference examples was identified by X-ray diffractometry (XRD), X-ray reflectometry (XRR), transmission electron microscopy (TEM), X-ray photoelectron spectrometry (XPS), atomic force microscopy (AFM), and by a visible light transmission measurement.

Herein X'ert PRO MRD by PANalytical was used for X-ray diffractometry (XRD). A 1.8 kW CuKα radiation source (8048 eV) was used as the X-ray source. Also, X-rays were collimated using an X-ray Mirror, were caused to strike a sample at an angle of about 1°, and an oblique incidence X-ray diffraction measurement was carried out with manipulation of the 2θ axis. Diffracted X-rays from the sample were collimated by a collimator, and were detected by a proportional counter.

For the X-ray reflectivity (XRR) measurement there was used X'pert PRO MRD by PANalytical. Further, a 1.8 kW CuKα radiation source (8048 eV) was used as the X-ray source. Also, X-rays were collimated using an X-ray Mirror, were caused to strike the sample at a grazing angle, and the dependence of X-ray reflectance on incidence angle was measured. Reflected X-rays from the sample were collimated by a collimator and were detected by a proportional counter.

Further, JEM-2010 by JEOL Ltd. was used for transmission electron microscopy (TEM) observation. A high-resolution observation was carried out at an acceleration voltage of 200 kV. An ion slicer EM-09100IS by JEOL Ltd. was used for sectioning for the aluminum oxide article. Further, Ultramicrotome MT-7000, by RMC Boeckeler, was used for an aluminum oxide article on a PET substrate.

An instrument AXIS-HS by Kratos Analytical Ltd. was used for X-ray photoelectron spectrometry (XPS). A monochromatized 150 W AlKα radiation source (1486.6 eV) was used as the X-ray source. High-resolution measurements were carried out at arbitrary locations within a range of about 0.8 mmϕ.

A microscope AFM5200S by Hitachi High-Tech Science Corporation was used as an atomic force microscope (AFM). Measurements were carried out in a dynamic force mode (DFM) measurement mode in which, in a state of resonation induced in a cantilever, surface morphology was measured while controlling the distance between probe and sample, in such a manner that the vibration amplitude of the lever was constant.

Visible light transmission was measured using V670, by JASCO Corporation. The measurement method involved transmittance measurement perpendicularly and using an integrating sphere. The measurement was performed in a range of wavelength 200 nm to wavelength 2500 nm. The following expression was used to calculate a haze ratio.

Haze ratio=(integrating sphere transmittance at specific wavelength−normal transmittance at specific wavelength)/integrating sphere transmittance at a specific wavelength× 100

The properties of the aluminum oxide articles in the examples, reference examples and comparative examples were evaluated in accordance with a pencil hardness test, a water vapor permeability test and a battery test.

Test Example 1

Pencil Hardness Test

The hardness of the aluminum oxide article was measured according to JIS K5600-5-4: Scratch hardness (Pencil method). Specifically, using a pencil hardness tester by Toyo Seiki Seisaku-sho, Ltd., a 750 g load was attached to the tester, in a measurement atmosphere at a temperature of 23±2 degrees and a humidity of 50±5% Rh, and a pencil was affixed to the sample at a 45-degree angle. The pencil was brought against the sample, and in that state, was caused to move over about 10 mm; an evaluation was repeated by lowering the hardness of the pencil in a case where the sample became scratched, and by increasing the hardness of the pencil in a case where the sample did not become scratched. The hardness of the pencil that resulted in scratching was taken herein as the pencil hardness.

Test Example 2

Water Vapor Permeability Test

A water vapor permeability test of the aluminum oxide article was performed according to JIS K7129, Appendix A, Dry-wet sensor method. Specifically, a substrate at a measurement temperature of 40° C., humidity of 90% Rh, a having a measurement diameter of 80 mm was set in a water vapor permeation meter (L80-5000) by Lyssy, and water vapor permeability was measured on the basis of permeation from the side on which the aluminum oxide article was not formed.

Example 1

The surface of a base material (18 mm square, single-crystal silicon substrate having a thickness of 0.25 mm) was coated, by spin coating, with solution A obtained in Synthesis example 1. Then 0.1 mL of solution A was dropped on the silicon substrate, at room temperature in the atmosphere, and the substrate was caused to rotate for 10 seconds at a rotational speed of 200 rpm, followed by rotation of the substrate for 20 seconds at a rotational speed of 2000 rpm, to coat the entirety of the silicon substrate with the solution. The substrate was then dried at room temperature, followed by baking at 100° C. for 2 hours, to yield an aluminum oxide article.

Further, TEM, XRD, XRR and AFM measurements were carried out in order to identify the obtained aluminum oxide article.

Figure 6:
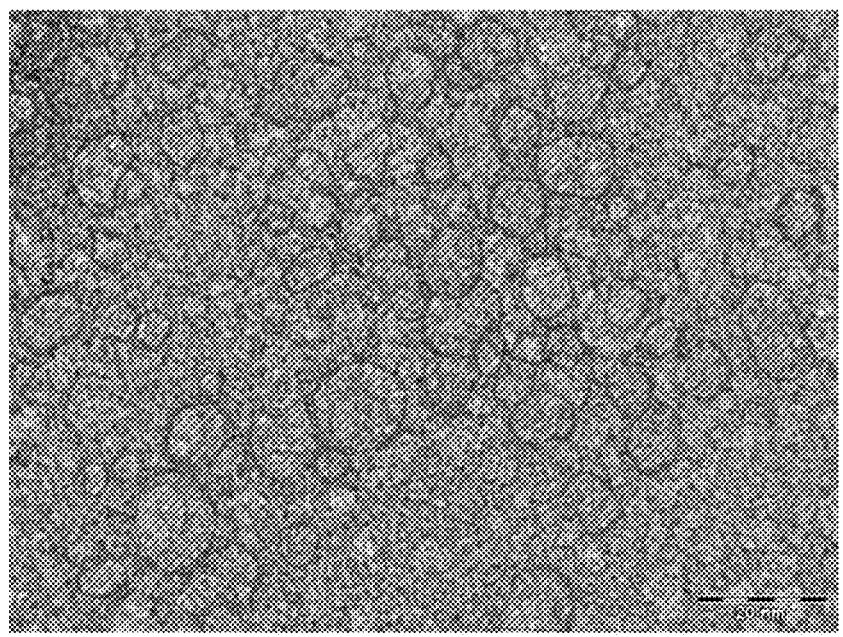
FIG. 6 is an identification result of island parts in the TEM image (200,000×) of Example 1.

A sea-island structure having a sea part and island parts was discerned on the basis of a cross-sectional TEM image (FIG. 5) of the aluminum oxide article, observed at 200,000× magnifications. FIG. 6 illustrates a diagram with hatched island parts. There was acquired a TEM image that allowed observing the entirety of the aluminum oxide, and discerning the sea-island structure, in the depth direction from the surface towards the interior of the aluminum oxide article. This TEM image is depicted in FIG. 1 (50,000×). Next, a TEM image (FIG. 3) observed by raising the observation magnifications in TEM to 1,500,000× revealed that the periphery of grains in the island parts was crystallized. In the depiction of FIG. 4 there are identified grains and peripheral crystallized portions of island parts, and the sea part as a non-crystalline portion.

Then a TEM image in which there could be observed the entire aluminum oxide article observed at low magnification was loaded, as digital data, into image analysis software (MacView), and the island portions, as bright areas, were identified by being regarded as grains. In the identified region the entire aluminum oxide article lies within a rectangle (of rectangular or square shape), in an orientation in the depth direction from the surface towards the interior of the aluminum oxide article. Further, the region of the rectangle was divided into three in the depth direction from the surface towards the interior of the aluminum oxide article, and there were identified the island parts in each of the three resulting regions, namely region 1 being a region of an outermost surface layer, region 2 being a region of an intermediate layer, and region 3 being a region of a deepest layer. As the method for identification there was used an identification method in which those Locations where shade contrast in the periphery of grains was distinct, and grains could be identified on the basis of differences in that shade contrast, were considered to be island parts. FIG. 2 illustrates results of identification of island parts. To identify the island parts, the image was enlarged as appropriate, and portions of distinct shade contrast at the periphery of grains were checked. The average value of the particle size of the island parts, and the number of island parts, in each region and the totality, were worked out thereafter. Island parts present in the vicinity of boundaries of respective regions were identified as island parts of that region in which the island parts were present in a higher area proportion. Volume-average diameter was used herein as the average value of particle size. Table 1 sets out average values of particle size of each region and the totality of the island parts.

A relationship of particle size of each region with respect to the totality was calculated using the average value of particle size of the island parts thus worked out, for each region and overall. The following expression was used in the calculation.

Ratio of particle size with respect to each region of island parts=average particle size in each region/overall average particle size A ratio of the number of island parts in each region with respect to the totality was calculated using the number of island parts (numbers of particles) having been worked out for each region and overall. The following expression was used in the calculation.

Ratio of number of the island parts for each region=number of island parts in each region/total number of island parts The calculation results are given in Table 1.

An XRD measurement of the aluminum oxide article carried out using the above XRD device did not yield diffraction peaks.

Lattice images were discerned on the basis of TEM images, and accordingly crystallized portions are present. The reason why nevertheless diffraction peaks were not found by XRD, although unclear, include conceivably the following. Firstly, the growth direction of the crystals in the crystallized portions is not fixed, and may take on various orientations, which results in weak diffraction intensity. Secondly, the crystallized portions are small, and hence diffraction intensity is weak.

An XRR measurement of aluminum oxide yielded a film density of 1.9 g/cm$^3$.

An AFM measurement of the aluminum oxide yielded a root mean square roughness of 1.219 nm.

A pencil hardness test was performed next in order to evaluate the characteristics of the aluminum oxide article.

The results of the pencil hardness test are given in Table 1.

Reference Example 1

The surface of a base material (18 mm square; single-crystal silicon substrate having a thickness of 0.25 mm) was coated, by spin coating, with solution B obtained in Synthesis example 2. Then 0.5 mL of solution B were dropped on the silicon substrate, at room temperature in the atmosphere, and the substrate was caused to rotate for 30 seconds at a rotational speed of 800 rpm, followed by rotation of the substrate for 8 seconds at a rotational speed of 2000 rpm, to coat the entirety of the silicon substrate with the solution, with subsequent drying at room temperature. After drying at room temperature, 0.3 mL of solution C obtained in Synthesis example 1 were applied, through dropping, on the silicon substrate. The substrate was then dried at room temperature, followed by baking at 100° C. for 2 hours, to yield aluminum oxide.

A pencil hardness test was performed next in order to evaluate the characteristics of the aluminum oxide article.

The results of the pencil hardness test are given in Table 1.

Example 2

An aluminum oxide article was obtained in the same way as in Example 1, but herein the baking temperature was modified to 700° C.

Further, TEM, XRD, XRR and AFM measurements were carried out in order to identify the obtained aluminum oxide article.

There was acquired a TEM image that allowed observing the entirety of the aluminum oxide article, and discerning the sea-island structure, in the depth direction from the surface towards the interior of the aluminum oxide. A sea-island structure having a sea part and island parts was discerned on the basis of the TEM image. Next, a TEM image observed by raising the observation magnifications in TEM to 1,500,000× revealed that the periphery of grains in the island parts was crystallized. Locations where shade contrast in the periphery of grains was distinct, and grains could be identified on the basis of differences in that shade contrast, were identified as island parts.

Image processing identical to that of Example 1 was then carried out, and the average value of the particle size of island parts, in each region and overall, the ratio of particle size of the island parts for each region, and the ratio of the number of island parts for each region, were calculated. The results are given in Table 1.

An XRD measurement of the aluminum oxide article, carried out using the above XRD device, did not yield diffraction peaks.

Conceivable reasons for the absence of diffraction peaks are similar to those of Example 1.

An XRR measurement of the aluminum oxide article yielded a film density of 2.2 g/cm$^3$.

An AFM measurement of the aluminum oxide article yielded a root mean square roughness of 6.214 nm.

A pencil hardness test was performed next in order to evaluate the characteristics of the aluminum oxide article.

The results of the pencil hardness test are given in Table 1.

Reference Example 2

An aluminum oxide article was obtained in the same way as in Reference example 1, but herein the baking temperature was set to 700° C.

Further, a TEM measurement was carried out in order to identify the obtained aluminum oxide article.

There was acquired a TEM image that allowed observing the entirety of the aluminum oxide article, and discerning the sea-island structure, in the depth direction from the surface towards the interior of the aluminum oxide. A sea-island structure having a sea part and island parts was discerned on the basis of the TEM image. Next, a TEM image observed by raising the observation magnifications in TEM to 1,500,000× revealed that the periphery of grains in the island parts was crystallized. Locations where shade contrast in the periphery of grains was distinct, and grains could be identified on the basis of differences in that shade contrast, were identified as island parts.

Image processing identical to that of Example 1 was then carried out, and the average value of the particle size of island parts, in each region and overall, the ratio of particle size of the island parts for each region, and the ratio of the number of island parts for each region, were calculated. The results are given in Table 1.

A pencil hardness test was performed next in order to evaluate the characteristics of the aluminum oxide article.

The results of the pencil hardness test are given in Table 1.

Example 3

An aluminum oxide article was obtained in the same way as in Example 1, but herein the base material that was used was modified to an 18 mm square PET substrate.

Further, a TEM measurement and a visible light transmission measurement were carried out in order to identify the obtained aluminum oxide article.

There was acquired a TEM image that allowed observing the entirety of the aluminum oxide article, and discerning the sea-island structure, in the depth direction from the surface towards the interior of the aluminum oxide article. A sea-island structure having a sea part and island parts was discerned on the basis of the TEM image. Next, a TEM image observed by raising the observation magnifications in TEM to 1,500,000× revealed that the periphery of grains in the island parts was crystallized. Locations where shade contrast in the periphery of grains was distinct, and grains could be identified on the basis of differences in that shade contrast, were identified as island parts.

Image processing identical to that of Example 1 was then carried out, and the average value of the particle size of island parts, in each region and overall, the ratio of particle size of the island parts for each region, and the ratio of the number of island parts for each region, were calculated. The results are given in Table 1.

The results of a visible light transmittance measurement of the aluminum oxide article yielded a normal-sphere transmittance at 550 nm of 84%, and an integrating sphere transmittance of 91%. A haze ratio worked out from the normal-sphere transmittance and the integrated transmittance was 8.3%.

A pencil hardness test and a gas barrier test were performed next in order to evaluate the characteristics of the aluminum oxide article.

The results of the pencil hardness test are given in Table 1.

The results of the gas barrier test are given in Table 2.

Reference Example 3

An aluminum oxide article was obtained in the same way as in Reference example 1, but herein the base material that was used was modified to an 18 mm square PET substrate.

Further, a TEM measurement was carried out in order to identify the obtained aluminum oxide article.

There was acquired a TEM image that allowed observing the entirety of the aluminum oxide article, and discerning the sea-island structure, in the depth direction from the surface towards the interior of the aluminum oxide article. A sea-island structure having a sea part and island parts was discerned on the basis of the TEM image. Next, a TEM image observed by raising the observation magnifications in TEM to 1,500,000× revealed that the periphery of grains in the island parts was crystallized. Locations where shade contrast in the periphery of grains was distinct, and grains could be identified on the basis of differences in that shade contrast, were identified as island parts.

Image processing identical to that of Example 1 was then carried out, and the average value of the particle size of island parts, in each region and overall, the ratio of particle size of the island parts for each region, and the ratio of the number of island parts for each region, were calculated. The results are given in Table 1.

A pencil hardness test and a gas barrier test were performed next in order to evaluate the characteristics of the aluminum oxide article.

The results of the pencil hardness test are given in Table 1.

The results of the gas barrier test are given in Table 2.

Example 4

An aluminum oxide article was obtained in the same way as in Example 1 but herein the baking temperature was modified to 200° C. and the base material that was used to a $LiCoO_2$ substrate (by Toshima Manufacturing Co., Ltd.).

The $LiCoO_2$ substrate is a substrate resulting from formation of a film by sputtering on a Si substrate.

Further, TEM, SEM and XPS measurements were carried out in order to identify the obtained aluminum oxide article.

Figure 7:
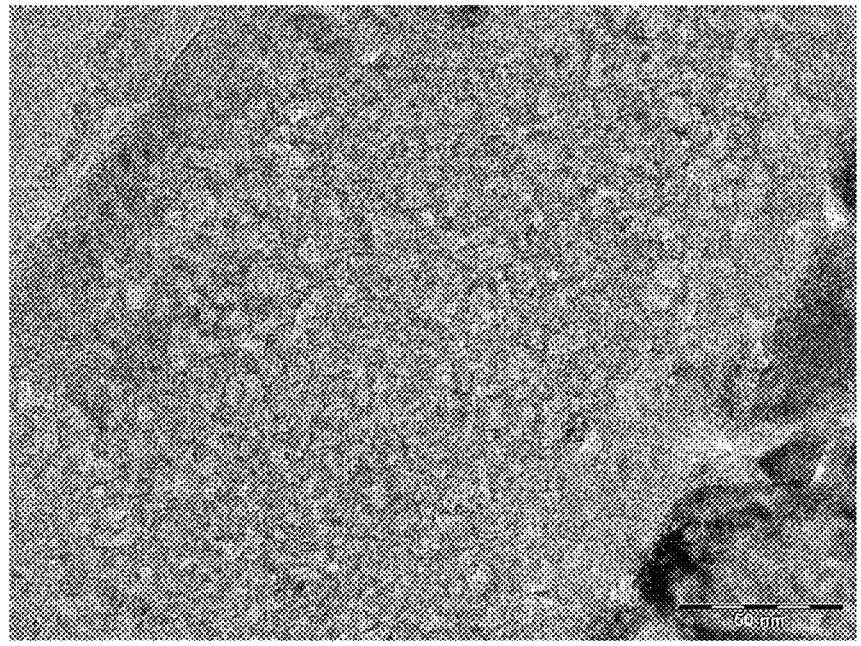
FIG. 7 is a TEM image (100,000×) of Example 4.

There was acquired a TEM image that allowed observing the entirety of the aluminum oxide article, and discerning the sea-island structure, in the depth direction from the surface towards the interior of the aluminum oxide article. This TEM image is depicted in FIG. 7 (100,000×). A sea-island structure having a sea part and island parts was discerned on the basis of the TEM image. Next, a TEM image observed by raising the observation magnifications in TEM to 1,500,000× revealed that the periphery of grains in the island parts was crystallized. Locations where shade contrast in the periphery of grains was distinct, and grains could be identified on the basis of differences in that shade contrast, were identified as island parts.

Figure 8:
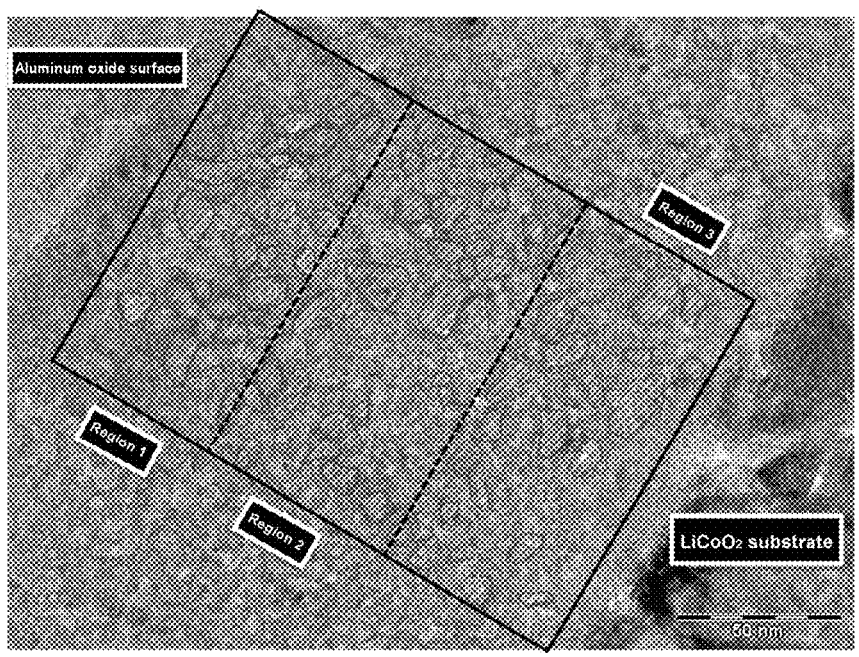
FIG. 8 is an identification result of island parts in the TEM image (100,000×) of Example 4.

Image processing identical to that of Example 1 was carried out. FIG. 8 illustrates results in which island parts are discerned. Thereafter, the average value of the particle size of island parts, in each region and overall, the ratio of particle size of the island parts for each region, and the ratio of the number of island parts for each region, were calculated. The results are given in Table 1.

The thickness of the aluminum oxide article from the base material was ascertained by SEM. The thickness of the aluminum oxide article from the base material was about 210 nm.

Argon etching was performed, and the XPS measurement was repeated, to obtain XPS peaks at the respective locations in the depth direction from the surface towards the interior of the aluminum oxide article.

The time required for argon etching from the surface of the aluminum oxide article to the base material was 13 minutes. The boundary between the aluminum oxide article and the base material ($LiCoO_2$) was further determined on the basis of the peaks of 2p orbitals of Co in $LiCoO_2$, which was the base material.

The etching rate was calculated on the basis of the thickness of the aluminum oxide article from the base material, worked out by SEM, and the time required for argon etching from the surface of the aluminum oxide down to the base material. The calculation result yielded an etching rate of 16 nm/minute.

Measurement locations of the measured aluminum oxide particle in the depth direction from the surface towards the interior of the measured aluminum oxide article were specified at 16 nm, 64 nm, 112 nm, 160 nm, 208 nm from the surface of the aluminum oxide article on the basis of the etching rate worked out above.

From the ratio of peak area intensity of Al and O it was found that the Al and O composition exhibited virtually no change, at all locations, in the depth direction from the surface towards the interior of the aluminum oxide article. The ratio of the composition of Al and O is given in Table 4.

TABLE 1

|  | Solution | Base material | Baking temperature [° C.] | Baking time [min] |
| --- | --- | --- | --- | --- |
| Example 1 | EAO | Si | 100 | 120 |
| Example 2 | EAO | Si | 700 | 120 |
| Example 3 | EAO | PET | 100 | 120 |
| Example 4 | EAO | $LiCoO_2$ | 200 | 120 |
| Reference example 1 | Sol-gel | Si | 100 | 120 |
| Reference example 2 | Sol-gel | Si | 700 | 120 |
| Reference example 3 | Sol-gel | PET | 100 | 120 |
| Reference example 4 | Sol-gel | $LiCoO_2$ | 200 | 120 |

|  | Average particle size of island parts | | | | Island parts of each region/total | | |
| --- | --- | --- | --- | --- | --- | --- | --- |
|  | Region 1 [nm] | Region 2 [nm] | Region 3 [nm] | Overall [nm] | Region 1 [Ratio] | Region 2 [Ratio] | Region 3 [Ratio] |
| Example 1 | 18.79 | 18.68 | 19.41 | 18.91 | 0.99 | 0.99 | 1.03 |
| Example 2 | 6.85 | 6.90 | 6.91 | 6.85 | 1.00 | 1.01 | 1.01 |
| Example 3 | 46.97 | 42.45 | 43.35 | 44.28 | 1.06 | 0.96 | 0.98 |
| Example 4 | 10.67 | 11.86 | 12.45 | 11.70 | 0.91 | 1.01 | 1.06 |
| Reference example 1 | — | — | — | — | — | — | — |
| Reference example 2 | 7.55 | 6.80 | 5.56 | 6.86 | 1.10 | 0.99 | 0.81 |

TABLE 1-continued

| | | | | | | | |
|---|---|---|---|---|---|---|---|
| Reference example 3 | 30.67 | 36.11 | 11.77 | 33.51 | 0.92 | 1.08 | 0.35 |
| Reference example 4 | 13.53 | 8.76 | 10.72 | 11.88 | 1.14 | 0.74 | 0.90 |

| | Number of island parts in each region/total | | | (Island parts of each region/total)/ (Number of island parts in each region/total) | | | Pencil hardness test |
|---|---|---|---|---|---|---|---|
| | Region 1 [Ratio] | Region 2 [Ratio] | Region 3 [Ratio] | Region 1 [Ratio] | Region 2 [Ratio] | Region 3 [Ratio] | |
| Example 1 | 0.40 | 0.33 | 0.27 | 0.39 | 0.33 | 0.28 | F |
| Example 2 | 0.36 | 0.37 | 0.27 | 0.36 | 0.37 | 0.27 | F |
| Example 3 | 0.33 | 0.27 | 0.28 | 0.35 | 0.26 | 0.28 | 2H |
| Example 4 | 0.39 | 0.34 | 0.27 | 0.36 | 0.35 | 0.28 | — |
| Reference example 1 | — | — | — | — | — | — | 4B |
| Reference example 2 | 0.31 | 0.38 | 0.31 | 0.34 | 0.38 | 0.25 | 4B |
| Reference example 3 | 0.40 | 0.35 | 0.25 | 0.37 | 0.38 | 0.09 | 3B |
| Reference example 4 | 0.41 | 0.21 | 0.38 | 0.47 | 0.15 | 0.34 | — |

TABLE 2

| | Solution | Base material | Baking temperature [° C.] | Baking time [min] | Water vapor permeability test [g/m²/day] |
|---|---|---|---|---|---|
| Example 3 | EAO | PET | 100 | 120 | 2.8 |
| Reference example 3 | Sol-gel | PET | 100 | 120 | 3.0 |
| Comparative example 1 | — | PET | — | — | 3.0 |

TABLE 3

| | Solution | Base material | Baking temperature [° C.] | Baking time [min] | Pencil hardness test |
|---|---|---|---|---|---|
| Comparative example 2 | EAO | Glass | 400 | 2 | 2B |
| Example 5 | | | | 5 | F |
| | | | | 10 | H |
| | | | | 30 | H |
| | | | | 60 | H |
| Comparative example 3 | EAO | PET | 100 | 2 | HB |
| | | | | 5 | HB |
| Example 6 | | | | 10 | 2H |
| Example 7 | EAO | PET | 75 | 10 | H |

TABLE 4

| Distance from surface [nm] | Peak area intensity ratio |
|---|---|
| 16 | 0.090 |
| 64 | 0.092 |
| 112 | 0.090 |
| 160 | 0.089 |
| 208 | 0.088 |

The peak of the 2p orbitals of Al was then separated into two peaks, namely separated peak 1 and separated peak 2. The peak positions of separated peak 1 and separated peak 2 were constant at all locations, in the depth direction from the surface to the inside of the aluminum oxide article. A Gaussian function was used for peak separation, on the basis of the peak fitting function of the analysis software OriginePro 2015.

The area ratios of the respective separated peaks are given in Table 5.

TABLE 5

| Distance from surface [nm] | Separated peak 1 [%] | Separated peak 2 [%] |
|---|---|---|
| 16 | 96.7 | 3.3 |
| 64 | 100.0 | 0.0 |
| 112 | 98.2 | 1.8 |
| 160 | 97.0 | 3.0 |
| 208 | 93.3 | 6.7 |

The ratios of the separated peak 1 and the separated peak 2 were substantially identical regardless of the measurement location, in the depth direction from the surface towards the interior of the aluminum oxide article. This revealed that the bonding state of aluminum atoms was substantially constant in the direction from the surface of the aluminum oxide article towards the base material.

Reference Example 4

An aluminum oxide article was obtained in the same way as in Reference example 1 but herein the baking temperature was modified to 200° C. and the base material that was used to a $LiCoO_2$ substrate (by Toshima Manufacturing Co., Ltd.).

The $LiCoO_2$ substrate is a substrate resulting from formation of a film by sputtering on a Si substrate.

Further, TEM, SEM and XPS measurements were carried out in order to identify the obtained aluminum oxide article.

Figure 9:
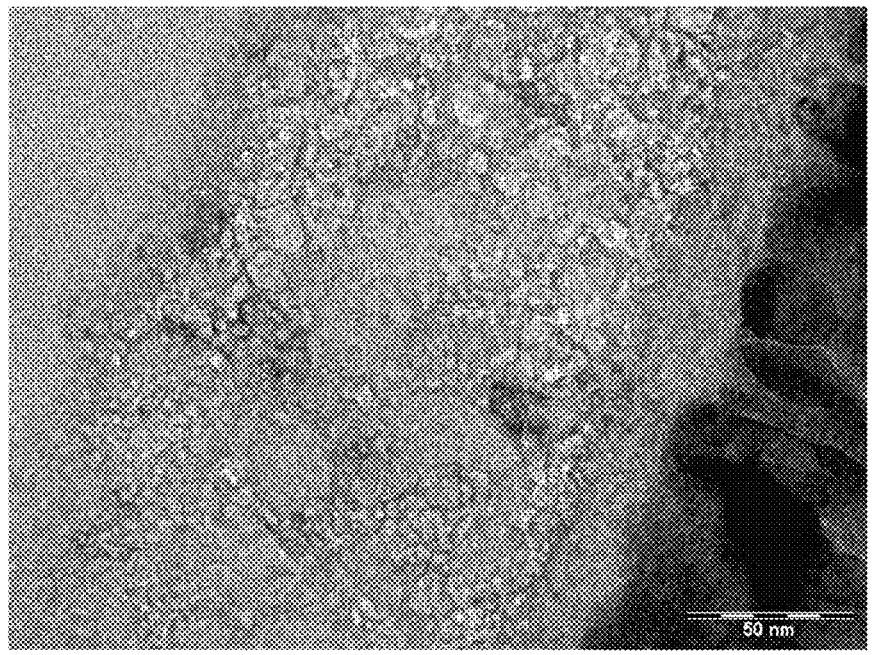
FIG. 9 is a TEM image (100,000×) of Reference example 4.

There was acquired a TEM image that allowed observing the entirety of the aluminum oxide article, and discerning the sea-island structure, in the depth direction from the surface towards the interior of the aluminum oxide article. This TEM image is depicted in FIG. 9 (100,000×). A sea-island structure having a sea part and island parts was discerned on the basis of the TEM image. Next, a TEM image observed by raising the observation magnifications in TEM to 1,500,000× revealed that the periphery of grains in the island parts was crystallized. Locations where shade contrast in the periphery of grains was distinct, and grains could be identified on the basis of differences in that shade contrast, were identified as island parts.

Figure 10:
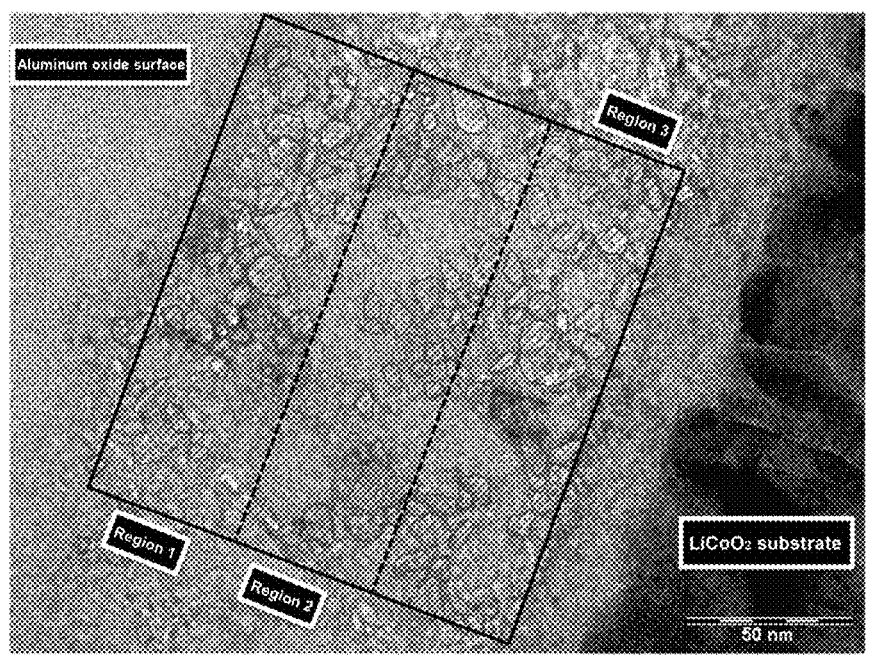
FIG. 10 is an identification result of island parts in the TEM image (100,000×) of Reference example 4.

Image processing identical to that of Example 1 was carried out. FIG. 10 illustrates results in which island parts are discerned. Thereafter, the average value of the particle size of island parts, in each region and overall, the ratio of particle size of the island parts for each region, and the ratio of the number of island parts for each region, were calculated. The results are given in Table 1.

The thickness of the aluminum oxide article from the base material was ascertained by SEM. The thickness of the aluminum oxide article from the base material was about 339 nm.

The time required for argon etching from the surface of the aluminum oxide article to the base material was 7 minutes. The boundary between the aluminum oxide and the base material ($LiCoO_2$) was further determined on the basis of the peaks of 2p orbitals of Co in $LiCoO_2$, which was the base material.

The etching rate was calculated on the basis of the thickness of the aluminum oxide article from the base material, worked out by SEM, and the time required for argon etching from the surface of the aluminum oxide article up to the base material. The calculation result yielded an etching rate of 48 nm/minute.

Measurement locations of the measured aluminum oxide article, in the direction from the surface of the aluminum oxide article towards the base material, were specified at 48 nm, 194 nm and 339 nm, from the aluminum oxide surface, on the basis of the etching rate worked out above.

From the ratio of peak area intensity of Al and O it was found that the Al and O composition exhibited virtually no change, at all locations, in the depth direction from the surface towards the interior of the aluminum oxide article. The ratio of the composition of Al and O is given in Table 6.

TABLE 6

| Distance from surface [nm] | Peak area intensity ratio |
| --- | --- |
| 49 | 0.090 |
| 193 | 0.092 |
| 338 | 0.090 |

The peak of the 2p orbitals of Al was then separated into two peaks, namely separated peak 1 and separated peak 2. The peak positions of separated peak 1 and separated peak 2 were constant at all locations, in the depth direction from the surface to the inside of the aluminum oxide article. A Gaussian function was used for peak separation, on the basis of the peak fitting function of the analysis software OriginePro 2015.

The area ratios of the respective separated peaks are given in Table 7.

TABLE 7

| Distance from surface [nm] | Separated peak 1 [%] | Separated peak 2 [%] |
| --- | --- | --- |
| 49 | 89.2 | 10.8 |
| 193 | 61.1 | 38.9 |
| 338 | 48.3 | 51.7 |

It was found that the ratio of the separated peak 2 increases with decreasing distance to the base material surface, in the depth direction from the surface towards the interior of the aluminum oxide article. This suggested that the bonding state of aluminum atoms is not constant in the depth direction from the surface towards the interior of the aluminum oxide article.

Comparative Example 1

A pencil hardness test and a gas barrier test were carried out in order to assess the characteristics of a PET substrate, as the base material.

The results of the gas barrier test are given in Table 2.

Comparative Example 2

An aluminum oxide article was obtained in the same way as in Example 1, but herein the baking temperature was modified to 400° C., the baking time to 2 minutes, and the base material to a glass substrate. A pencil hardness test was performed next in order to evaluate the characteristics of the aluminum oxide article. The results of the pencil hardness test are given in Table 3.

Example 5

An aluminum oxide article was obtained in the same way as in Example 1, but herein the baking temperature was modified to 400° C., the baking time to 5 minutes, 10 minutes, 30 minutes and 60 minutes, and the base material to a glass substrate.

A pencil hardness test was performed next in order to evaluate the characteristics of the aluminum oxide article.

The results of the pencil hardness test are given in Table 3.

Comparative Example 3

An aluminum oxide article was obtained in the same way as in Example 1, but herein the baking time was modified to 2 minutes and 5 minutes, and the base material to a PET substrate.

A pencil hardness test was performed next in order to evaluate the characteristics of the aluminum oxide article.

The results of the pencil hardness test are given in Table 3.

Example 6

An aluminum oxide article was obtained in the same way as in Example 1, but herein the baking time was modified to 10 minutes, and the base material to a PET substrate.

A pencil hardness test was performed next in order to evaluate the characteristics of the aluminum oxide article.

The results of the pencil hardness test are given in Table 3.

Example 7

An aluminum oxide article was obtained in the same way as in Example 1, but herein the baking temperature was modified to 75° C., the baking time to 10 minutes, and the base material to a PET substrate.

A pencil hardness test was performed next in order to evaluate the characteristics of the aluminum oxide article.

The results of the pencil hardness test are given in Table 3.

Example 8

Herein there was used lithium cobaltate (by Aldrich, 99.8% trace metals basis; hereafter $LiCoO_2$ for short) dried at 100° C. under 5 kPa for about 3 hours. Then 9.3 g of NMP were added to 20 g of pretreated $LiCoO_2$, under a nitrogen stream, with stirring to bring about a slurry state. Then 0.6 g (0.5 parts by mass with respect to 100 parts by mass of $LiCoO_2$, on alumina basis) of solution A (aluminum concentration 6.2 wt %) synthesized in Synthesis example 1 were added to this slurry solution, with overnight stirring. Next, the solvent was distilled off using an evaporator, followed by transfer to a crucible in the atmosphere, with a baking treatment for 2 hours at a temperature of 200° C. The aluminum concentration in the $LiCoO_2$ coated with aluminum oxide thus obtained was measured using an ICP atomic emission spectrometer. As a result, it was found that the aluminum concentration was 0.15 wt %, i.e. substantially the theoretical value.

There was acquired a TEM image that allowed observing the entirety of the aluminum oxide article, and discerning the sea-island structure, in the depth direction from the surface towards the interior of the aluminum oxide article. A sea-island structure having a sea part and island parts was discerned on the basis of the TEM image. Next, a TEM image observed by raising the observation magnifications in TEM to 1,500,000× revealed that the periphery of grains in the island parts was crystallized. Locations where shade contrast in the periphery of grains was distinct, and grains could be identified on the basis of differences in that shade contrast, were identified as island parts. From the TEM image it was found that the island parts were uniformly interspersed.

Acetylene black as a conductive aid and polyvinylidene fluoride (PVDF) as a binder were mixed with the obtained $LiCoO_2$ coated with an aluminum oxide article, to a ratio of aluminum oxide-coated $LiCoO_2$:acetylene black:PVDF=94:3:3, and the mixture was made into a slurry using NMP; the slurry was then applied onto an aluminum-made collector, to a constant film thickness, with drying, to yield a positive electrode sheet.

As an electrolyte solution there was used a solution resulting from dissolving lithium hexafluorophosphate ($LiPF_6$) as an electrolyte to a concentration of 1.0 mol/L, in a mixed solvent (battery grade, by Kishida Chemical Co., Ltd.) obtained by mixing ethylene carbonate (hereafter EC for short) and ethyl methyl carbonate (hereafter EMC for short), as electrolyte solvents, to a volume ratio of 3:7.

Figure 11:
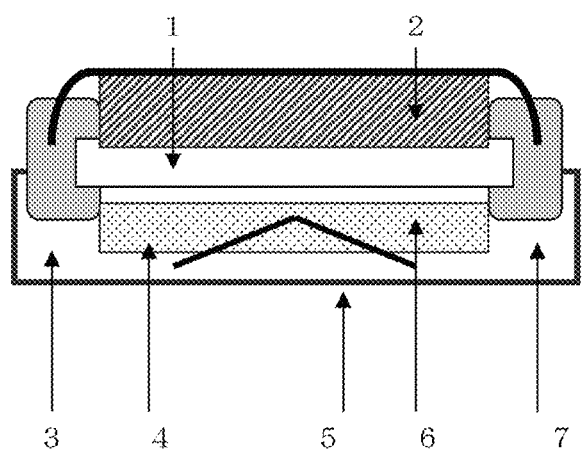
FIG. 11 is a schematic diagram illustrating a coin-cell battery used in Example 7.

A lithium secondary battery that utilized a coin-type cell, having the structure illustrated in FIG. 11, was then produced using a metal lithium foil (0.5 mm thick, by The Honjo Chemical Corporation) as a negative electrode active material, and using an inorganic filler-containing polyolefin porous film as a separator. To configure the lithium secondary battery, herein the positive electrode 1 and the negative electrode 4 were disposed opposing each other across a separator 6, a stainless steel-made leaf spring 5 was set on a negative electrode stainless steel-made cap 3, and a stack made up of the negative electrode 4, the separator 6 and the positive electrode 1 was accommodated within a coin-type cell. The electrolyte solution of the present invention was injected into this stack, a gasket 7 was then set, and thereafter a positive electrode stainless steel-made cap 2 was placed, followed by crimping of a coin-type cell case.

A coin cell-type lithium secondary battery (half cell) produced using metallic lithium and this $LiCoO_2$ positive electrode coated with aluminum oxide was charged, at a constant temperature of 25° C., and at a charging current of 0.1 CmA, with an upper limit voltage set to 4.2 V, and the battery was then discharged down to 3.0 V at a discharge current of 0.1 CmA. This operation was repeated thrice, after which the battery was charged up to 4.5 V at constant current and low voltage, at a constant temperature of 50° C. and with a charging current of 1 CmA, and was then discharged at constant current down a final voltage of 3.0 V, with a discharge current of 1 CmA. The discharge capacity at this time was taken as the initial discharge capacity. The discharge capacity upon repetition of this operation for 100 times was measured, and a comparison was made using a ratio of the discharge capacity after 100 cycles and the initial discharge capacity, as a cycle retention rate. The result yielded a discharge capacity retention rate after 100 of 96%.

Comparative Example 4

A positive electrode sheet and a coin cell-type lithium secondary battery were produced in the same way as in Example 9, except that herein $LiCoO_2$ was not subjected to a coating treatment, and a charge and discharge test was performed. The result yielded a discharge capacity retention rate after 100 cycles of 14%.

Example 9

Herein 4.6 g of NMP were mixed with 10 g of $LiCoO_2$ (by Aldrich), with further mixing of 0.42 g of solution A (aluminum concentration 6.2 wt %) synthesized in accordance with the same method as in Synthesis example 1, in a nitrogen atmosphere. A reflux device was attached to the mixed solution, and the solution was heated at 50° C., under a nitrogen stream, with continuous stirring for 6 hours. The resulting solution was cooled, and thereafter was mixed with acetylene black (AB) and PVdF, at a ratio by weight of $LiCoO_2$:AB:PVdF=94:3:3, whereupon the resulting mixture was made into a slurry using NMP; the slurry was then applied onto an aluminum-made collector, to a constant film thickness, with drying, to yield a positive electrode sheet. Then a coin cell-type lithium secondary battery was produced in accordance with the same method as in Production example 1, using the obtained positive electrode sheet.

A coin cell-type lithium secondary battery (half cell) produced using metallic lithium and the produced $LiCoO_2$ positive electrode coated with an aluminum oxide article was charged, at a constant temperature of 25° C., and at a charging current of 0.1 CmA, with an upper limit voltage set to 4.2 V, and the battery was then discharged down to 3.0 V at a discharge current of 0.1 CmA. This operation was repeated thrice, after which the battery was charged up to 4.5 V at constant current and low voltage, at a constant temperature of 25° C. and with a charging current of 1 CmA, and was then discharged at constant current down to a final voltage of 3.0 V, with a discharge current of 1 CmA. The discharge capacity at this time was taken as the initial discharge capacity. The discharge capacity upon repetition of this operation for 100 times was measured, and a comparison was made using a ratio of the discharge capacity after 100 cycles and the initial discharge capacity as a cycle retention rate. The discharge capacity retention rate after 100 cycles was 27% as a result.

INDUSTRIAL APPLICABILITY

The present invention is useful in the field of aluminum oxide articles that are useful as electrode coating films, cured films, gas barrier films and the like.

REFERENCE SIGNS LIST

1 Positive electrode
2 Positive electrode stainless steel-made cap
3 Negative electrode stainless steel-made cap
4 Negative electrode
5 Stainless steel-made leaf spring
6 Porous separator of inorganic filler-containing polyolefin
7 Gasket

The invention claimed is:

1. An aluminum oxide article composed of at least of aluminum atoms and oxygen atoms,
wherein a cross section of the aluminum oxide article as observed by transmission electron microscopy includes a crystallized portion in which a crystal lattice image is identified, and a non-crystalline portion in which no crystal lattice image is identified;
the article has a sea-island structure including isolated portions that include the crystallized portion, and a continuous non-crystalline portion, wherein the isolated portions correspond to island parts of the sea-island structure, and the continuous non-crystalline portion corresponds to a sea part of the sea-island structure; and
a plurality of the island parts is uniformly interspersed in the sea part;
wherein when a transmission electron microscopy image of a cross section of the aluminum oxide article is evenly divided into three in the depth direction from the article surface, the relationships $0.9<A/X$, $B/X$, and $C/X<1.1$ are satisfied, when the average value of particle size of the island parts present in an outermost surface region is denoted by A, the average value of particle size of the island parts present in a middle region is denoted by B, the average value of particle size of the island parts present in a deepest region is denoted by C, and the average value of particle size of the island parts present over the entire cross section of the article is denoted by X.

2. The aluminum oxide article according to claim 1, wherein the island parts have a structure in which no crystal lattice image is identified in a central portion, while a peripheral portion is the crystallized portion.

3. The aluminum oxide article according to claim 1, wherein the sea-island structure in which a plurality of the island parts is uniformly interspersed in a sea is observed in a region of at least 100 nm×100 nm within an image of the cross section.

4. The aluminum oxide article according to claim 1, wherein the article is a thin film, independent film, or independent mass provided on a base material.

5. The aluminum oxide article according to claim 1, wherein when a transmission electron microscopy image of a cross section of the aluminum oxide article is evenly divided into three in the depth direction from the article surface, the relationships $0.27<a/Y$, $b/Y$, and $c/Y<0.40$ are satisfied when the number of island parts in an outermost surface region is denoted by a, the number of island parts in a middle region is denoted by b, the number of island parts in a deepest layer is denoted by c, and the number of islands in total is denoted by Y.

6. The aluminum oxide article according to claim 1, wherein the article has a pencil hardness of F, or harder than F.

7. A method for producing an aluminum oxide article, comprising: a step of preparing in the atmosphere a dried product containing an alkylaluminum partial hydrolysate from a solution containing an alkylaluminum partial hydrolysate; and
a step of heating in the atmosphere the dried product at a temperature of 70° C. or higher to obtain an aluminum oxide article composed at least of aluminum atoms and oxygen atoms,
wherein the heating is carried out until an aluminum oxide article having a structure that satisfies (1) to (3) below is obtained, and wherein when a transmission electron microscopy image of a cross section of the aluminum oxide article is evenly divided into three in the depth direction from the article surface, the relationships $0.9<A/X$, $B/X$, and $C/X<1.1$ are satisfied, when the average value of particle size of the island parts present in an outermost surface region is denoted by A, the average value of particle size of the island parts present in a middle region is denoted by B, the average value of particle size of the island parts present in a deepest region is denoted by C, and the average value of particle size of the island parts present over the entire cross section of the article is denoted by X,
(1) a cross section of the aluminum oxide article as observed by transmission electron microscopy includes a crystallized portion in which a crystal lattice image is identified, and a non-crystalline portion in which no crystal lattice image is identified;
(2) the article has a sea-island structure including isolated portions that include the crystallized portion, and a continuous non-crystalline portion, wherein the isolated portions correspond to island parts of the sea-island structure, and the continuous non-crystalline portion corresponds to a sea part of the sea-island structure; and
(3) a plurality of the island parts is uniformly interspersed in the sea part.

8. The production method according to claim 7, wherein conditions in the heating are a baking time of 10 minutes or longer at a temperature of 100° C. in the atmosphere, and a baking time of 2 minutes or longer at a 400° C.

9. The production method according to claim 7, wherein the alkylaluminum is a compound represented by Formula (1) below:

$$AlR^1{}_{3-n}X_n \qquad (1)$$

wherein in the formula, $R^1$ each independently represent a $C_1$-$C_8$ linear or branched alkyl group, alkoxy group or acyloxy group; X represents hydrogen or a halogen atom; and n is an integer from 0 to 2.

10. The production method according to claim 9, wherein the alkylaluminum partial hydrolysate is obtained using water in a molar ratio of 1.3 or less with respect to the alkylaluminum of Formula (1).

11. The production method according to claim 7, wherein the dried product is prepared on a base material.

12. The production method according to claim 7, wherein the thickness of the aluminum oxide article from the surface to a deepest part falls within the range of 5 nm to 5 µm.

* * * * *